(12) United States Patent
Schmidt et al.

(10) Patent No.: US 7,124,770 B2
(45) Date of Patent: Oct. 24, 2006

(54) SHEAR MECHANISM FOR BACKPRESSURE RELIEF IN A CHOKE VALVE

(75) Inventors: Robert F. Schmidt, Cypress, TX (US); David A. Schmidt, Houston, TX (US); John W. McCaskill, Jersey Village, TX (US)

(73) Assignee: Power Well Services, L.P., Houston, TX (US)

( * ) Notice: Subject to any disclaimer, the term of this patent is extended or adjusted under 35 U.S.C. 154(b) by 428 days.

(21) Appl. No.: 10/760,910

(22) Filed: Jan. 20, 2004

(65) Prior Publication Data

US 2005/0072464 A1   Apr. 7, 2005

Related U.S. Application Data

(60) Provisional application No. 60/508,182, filed on Oct. 2, 2003.

(51) Int. Cl.
 *F16K 17/14*   (2006.01)
 *F16K 17/40*   (2006.01)

(52) U.S. Cl. ............... 137/68.16; 137/71; 137/797; 251/82; 251/282

(58) Field of Classification Search ............ 137/68.16, 137/71, 797; 251/120, 121, 122, 282, 82, 251/83
See application file for complete search history.

(56) References Cited

U.S. PATENT DOCUMENTS

| | | | | |
|---|---|---|---|---|
| 1,568,057 A | * | 1/1926 | Carr | ............ 137/797 |
| 2,092,819 A | * | 9/1937 | Tennant | ............ 137/70 |
| 2,304,491 A | | 12/1942 | Allen | |
| 2,644,486 A | | 7/1953 | Christensen | |
| 3,298,389 A | * | 1/1967 | Freeman | ............ 251/282 |
| 3,881,511 A | | 5/1975 | Dollison | |
| 3,973,586 A | | 8/1976 | Hill et al. | |
| 4,082,104 A | | 4/1978 | Keeney | |
| 4,160,484 A | | 7/1979 | Watkins | |
| 4,359,094 A | | 11/1982 | Risinger | |
| 4,518,148 A | * | 5/1985 | Renfro | ............ 251/122 |
| 4,587,987 A | | 5/1986 | West | |
| 4,688,593 A | | 8/1987 | Pringle et al. | |
| 5,071,288 A | | 12/1991 | Brisco | |
| 6,070,672 A | | 6/2000 | Gazda | |
| 6,644,336 B1 | * | 11/2003 | Dolan | ............ 137/68.16 |

* cited by examiner

*Primary Examiner*—John Rivell
(74) *Attorney, Agent, or Firm*—Elizabeth R. Hall

(57) ABSTRACT

The present invention relates to a mechanism for preventing damage to the actuator of a hydraulic choke valve in the event of excessive backpressure on the outlet of the choke. The backpressure relief device is applicable to a choke valve which meters flow from a high pressure annular region around the axially reciprocable choke throttling member into a low pressure exit channel coaxial with the throttling member. In particular, a shearable means is used to connect the reciprocable control shank of the actuator to the throttling valve member of the choke valve. In the event of excessive pressure on the exit channel of the choke valve, the shearable means will shear, thereby fully opening the valve and permitting the excessive pressure to escape. The shearable means is readily replaced so that the valve easily can be put back into operating condition.

17 Claims, 7 Drawing Sheets

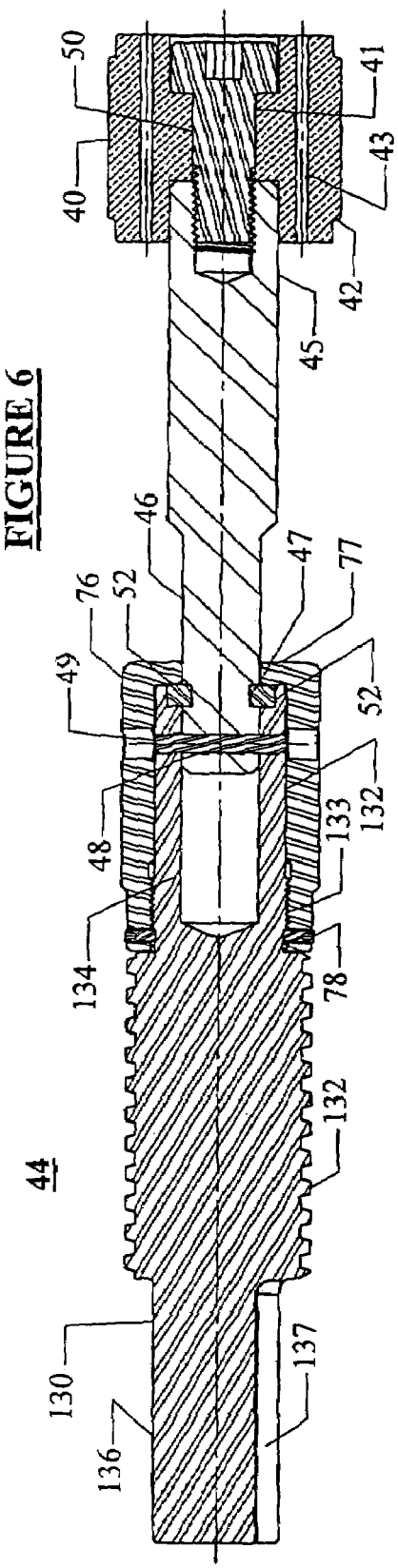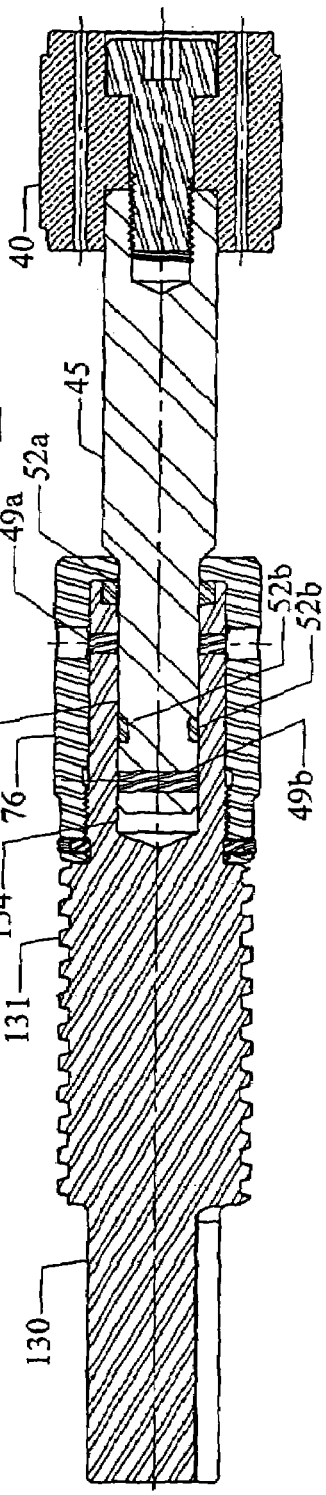

SHEAR MECHANISM FOR BACKPRESSURE RELIEF IN A CHOKE VALVE

CROSS REFERENCE TO RELATED APPLICATIONS

This application claims priority to pending U.S. patent application Ser. No. 60/508,182, filed Oct. 2, 2003 by Robert Schmidt, et al. and entitled "Shear Mechanism for Backpressure Relief in a Choke Valve".

BACKGROUND OF THE INVENTION

1. Field of the Invention

The present invention relates to an apparatus and method for providing relief to a hydraulic choke from exposure to excessive backpressure. More particularly, the present invention relates to pressure reducing valves and valve openings having shearable restraints.

2. Description of the Related Art

The present invention is applicable to hydraulic choke valves, which are a subclass of pressure reducing valves. Choke type pressure reducing valves generally function by causing a portion of the potential energy of a pressurized fluid to be dissipated through turbulence when the pressurized fluid is passed through a restrictive orifice. Typically, the orifice of a choke valve is selectably variable through reciprocation of its valving member toward and away from the valve seat, so that a desired combination of flow and exit pressure may be obtained.

A choke valve is normally open and is designed for one-way flow. This construction differs from that of a relief valve, which is another type of one-way flow valve that is normally closed. The present invention is applicable to a choke valve that differs in construction from the most common arrangement of such valves in having its flow gate pressure-balanced. Because of the pressure balancing of the sealing plug, the actuating loads on the stem of the flow gate are considerably reduced compared to those of most choke valves of comparable capacity. However, the stem of the flow gate, which connects to the reciprocable control screw of the actuator used to reciprocate the flow gate for this type of choke, is not pressure balanced. The present invention has as its purpose the release of excessive backpressure induced axial loads on the flow gate stem in order to avoid overload of the stem or the actuator that is attached to the stem.

The concept of a shearable release as a means of opening a relief valve on a one-time basis prior to rebuilding of the valve is disclosed in Allen U.S. Pat. No. 2,304,491, where a common nail is used as a shear pin. The sealing plug of the Allen valve is directly restrained against reciprocably unseating by the nail.

West U.S. Pat. No. 4,587,987 discloses a relief valve very similar to that of Allen, but with an indirectly acting shear mechanism. West uses a four-bar linkage mechanism that has a shearable link interconnecting two of its arms. The shaft of the West sealing plug is restrained by abutting one bar of the linkage, where one end of that bar is held by the shearable link. When the link shears due to excessive reaction loads to the forces applied to the supporting bar by the valve plug, the plug unseats to release the pressure.

Risinger U.S. Pat. No. 4,359,094 discloses a relief valve that has multiple directly acting releases for its sealing valving members, wherein the valving members are held by shear screws or shear pins. This particular construction is made to be inserted into a well bore to control a flow bypass.

While the references above do show shear release means for opening relief valves that are closed, there is a need for a shear release means for pressure reducing valves that are either open or closed.

SUMMARY OF THE INVENTION

The invention contemplates a simple, easy means to release excessive backpressure acting on the throttling and sealing member of a pressure reducing valve before overloading either the stem of the valve or its actuator. The shearable means of the present invention is applicable to pressure reducing valves that operate through reciprocation of their valving members and is useable with a wide variety of valve actuator types.

One aspect of the present invention is a choke valve comprising: a body having an axial through hole and a radial entry port; a valve seat coaxially housed in the body axial through hole on a first side of said radial entry port; a pressure balanced valving member axially reciprocable within the body axial through hole between a first sealing position bearing against said valve seat and a second position spaced away from said seat; actuator means for applying reciprocatory motion to the pressure balanced valving member through an intermediate structure; and a shearable mechanism interconnecting the actuator means and the valving member, wherein the shearable mechanism is responsive to fluid pressure in excess of a predetermined value.

Another aspect of the present invention is a choke valve comprising: a body having an axial through hole passing from a first side of the body to a second side of the body, an outlet passageway coaxially aligned with the through hole and positioned at the first side of the body, and a radial inlet port intersecting the through hole between the first and second sides of the body; a valve seat coaxially housed in the through hole between the inlet port and the outlet passageway; a valving member axially reciprocable within the through hole between a first position bearing against the valve seat and a second open position spaced away from the valve seat; an actuator attached to the second side of the body for reciprocably moving the valving member between the first position and the second position; and a shearable mechanism having a stem interconnecting the actuator and the valving member; whereby whenever the shearable mechanism is subjected to fluid pressure in excess of a predetermined value from the outlet passageway the shearable mechanism will shear and the stem and the valving member will move away from the valve seat.

Yet another aspect of the present invention is a choke valve comprising: a body having an axial through hole passing from a first side of the body to a second side of the body, an outlet passageway coaxially aligned with the through hole and positioned at the first side of the body, and a radial inlet port intersecting the through hole between the first and second sides of the body; a valve seat coaxially housed in the through hole between the inlet port and the outlet passageway; a pressure balanced valving member axially reciprocable within the through hole between a first position bearing against the valve seat and a second open position spaced away from the valve seat; an actuator attached to the second side of the body, the actuator having an axially reciprocating actuator shank for reciprocably moving the valving member between the first position and the second position; and a shearable mechanism interconnecting the actuator shank and the valving member, the shearable mechanism comprising a stem, a first end of the stem positioned in a socket in one end of the actuator shank and a second end of the stem mounted to the valving member, and a shear pin passing through the stem proximal to first end of the stem and passing through a wall of the socket in the actuator shank when the first end of the stem is located in the socket at less than a full depth of the socket; whereby whenever the valving member is subjected to a fluid pressure in excess of a predetermined value from the outlet passageway the shear pin will shear and the stem will move further into the socket in the actuator shank thereby moving the valving member away from the valve seat.

Still yet another aspect of the present invention is a choke valve comprising: a body having an axial through hole passing from a first side of the body to a second side of the body, an outlet passageway coaxially aligned with the through hole and positioned at the first side of the body, and a radial inlet port intersecting the through hole between the first and second sides of the body; a valve seat coaxially housed in the through hole between the inlet port and the outlet passageway; a pressure balanced valving member axially reciprocable within the through hole between a first position bearing against the valve seat and a second open position spaced away from the valve seat; an actuator attached to the second side of the body, the actuator having an axially reciprocating actuator shank for reciprocably moving the valving member between the first position and the second position; and a shearable mechanism interconnecting the actuator shank and the valving member, the shearable mechanism comprising a stem, a first end of the stem positioned in a socket in one end of the actuator shank at less than a full depth of the socket and a second end of the stem mounted to the valving member, a pair of split shear ring halves mounted in a mounting groove in the stem proximal to the first end of the stem, and a shear ring keeper device mounted over the shear ring halves to maintain the shear ring halves in position; whereby whenever the shearable mechanism is subjected to a fluid pressure in excess of a predetermined value from the outlet passageway the shear ring halves will shear and the stem will move further into the socket in the actuator shank thereby moving the valving member away from the valve seat.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 is a longitudinal sectional view of the throttling member assembly with the shearable overpressure protection mechanism intact;

FIG. 7 is a longitudinal sectional view, corresponding to FIG. 6, of the throttling member assembly with the shearable overpressure protection mechanism sheared.

DESCRIPTION OF THE PREFERRED EMBODIMENTS

The present invention provides a shear release mechanism for releasing excessive backpressure acting on the throttling and sealing member of a pressure reducing valve before overloading either the stem of the valve or its actuator. This shear release mechanism operates through the reciprocation of the valving member and is applicable in a wide variety of valve actuator types.

Figure 1:
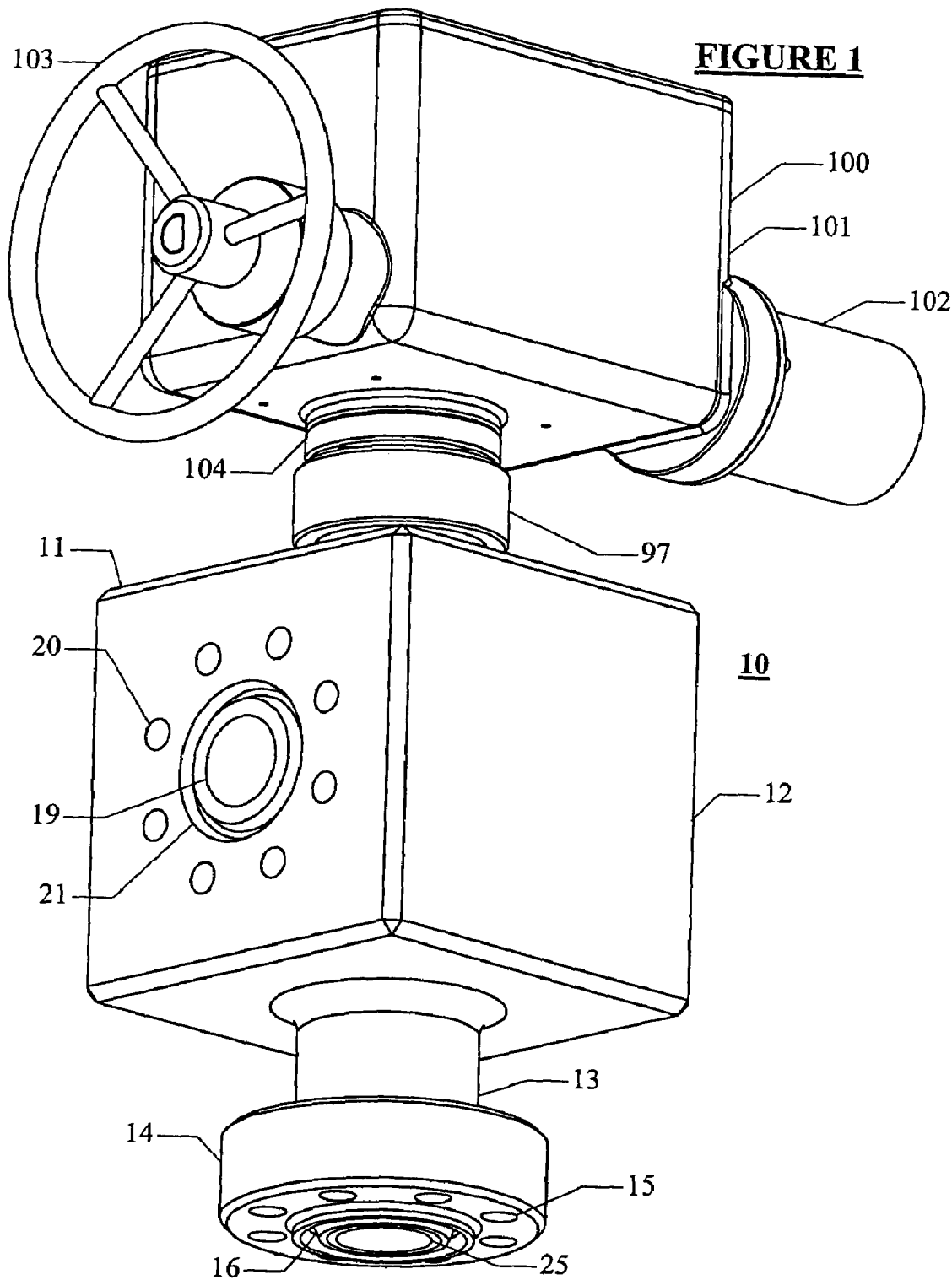
FIG. 1 is an oblique view of a hydraulic choke valve with its actuator, where the choke meters flow from a high pressure annular region around the axially reciprocable choke throttling member into a low pressure exit channel coaxial with the throttling member.

Referring now to the drawings, and initially to FIG. 1, it is pointed out that like reference characters designate like or similar parts throughout the drawings. The Figures, or drawings, are not intended to be to scale. For example, purely for the sake of greater clarity in the drawings, wall thickness and spacing are not dimensioned as they actually exist in the assembled embodiment.

FIG. 1 shows a partial longitudinal section of one embodiment of a hydraulic choke valve of the present invention. Although the materials of construction of the choke valve and its actuator may vary, typically they are constructed of a high strength low alloy steel, mild steel, or, in the case of O-rings and other elastomeric seals, Viton™ or nitrile rubber.

Figure 2:
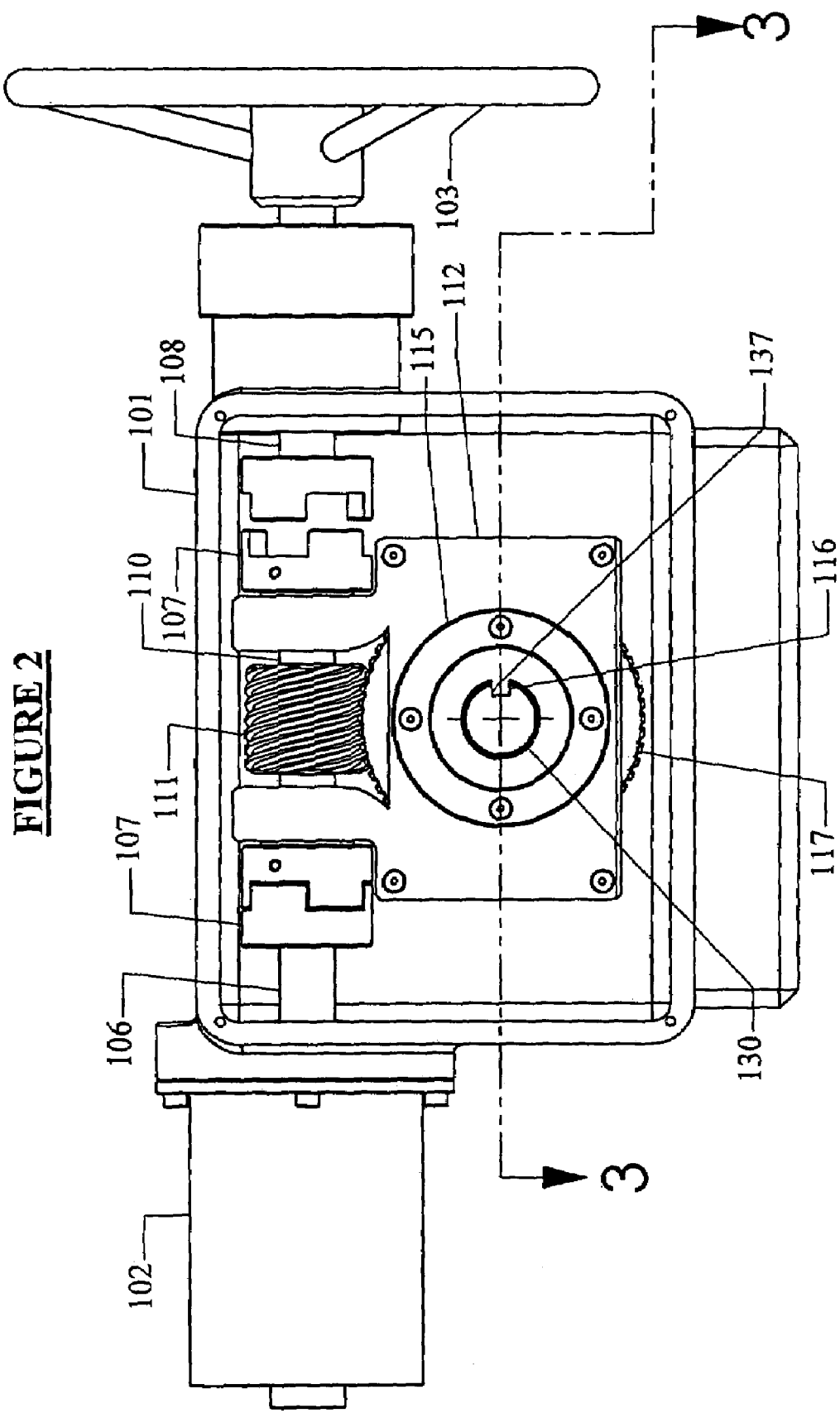
FIG. 2 is an axial view of the choke and actuator of FIG. 1 from the actuator side of the choke with the lid of the actuator removed.
Figure 3:
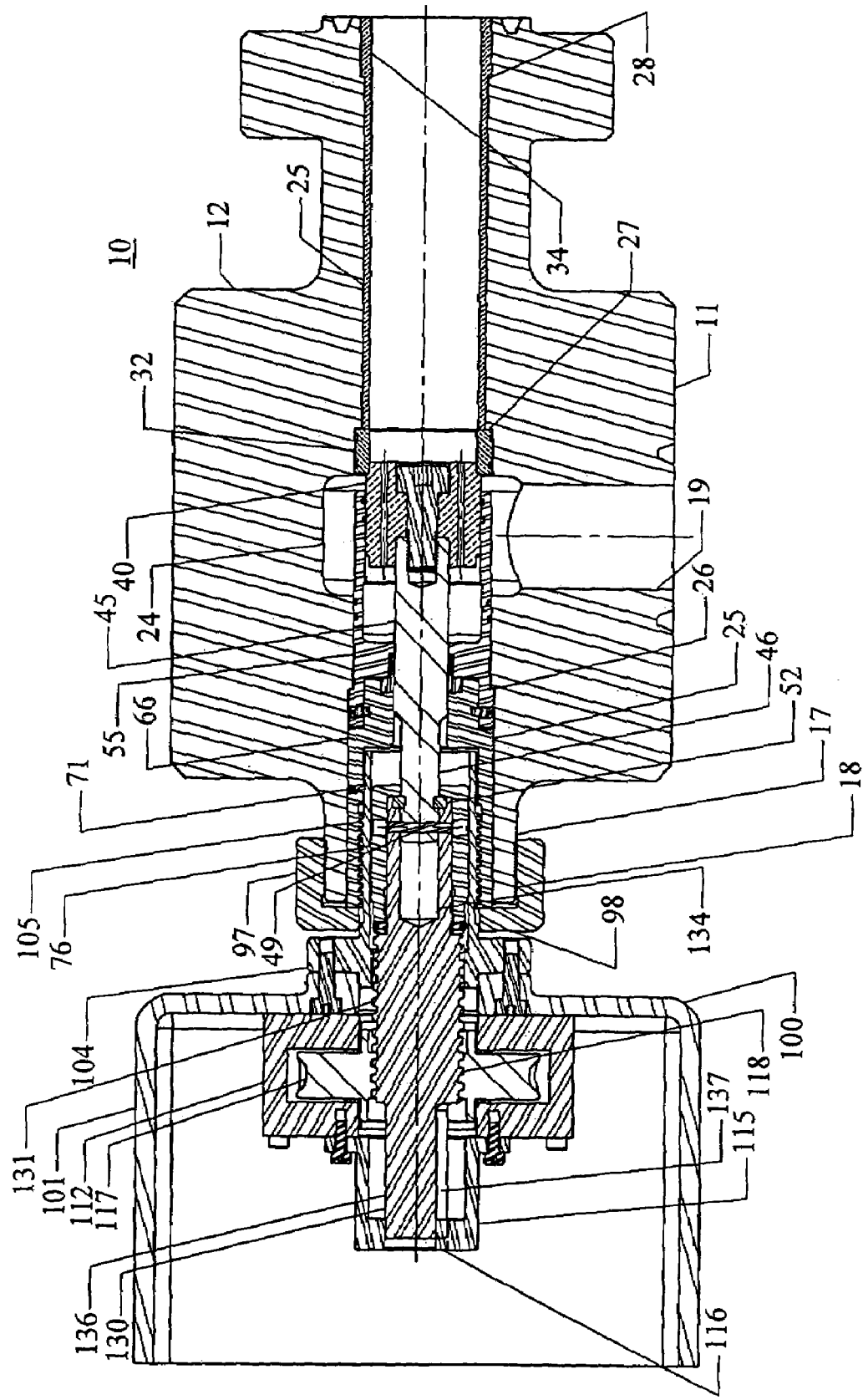
FIG. 3 is a longitudinal sectional view of the choke and actuator taken along the section line 3—3 of FIG. 2.

FIGS. 1 to 3 illustrate an assembled hydraulic choke valve system 10 consisting of a hydraulic choke valve 11 and an electrically or manually powered actuator 100. Herein, the term "hydraulic choke" is taken to refer to the fact that the device is used with a variety of fluids, such as drilling mud, salt water, oil, gas, and other chemicals which may be injected into a well. "Hydraulic" does not herein refer to the choke actuation means.

The body 12 of the hydraulic choke valve 11 is a heavy walled steel right rectangular prism with an axial passage 25 extending completely through body 12. The body 12 has a centrally positioned heavy walled projecting central cylindrical neck outlet branch 13 containing coaxially positioned axial passage 25 extending downwardly through neck 13. The flow entry for the choke is inlet port 19, and the flow exit is the righthand end of axial passage 25, as shown in FIG. 3.

Concentric transverse outlet flange 14 is positioned at the outer end of the outlet branch 13. Body 12 also has a cylindrical actuator mounting neck 17 extending outwardly concentrically with the outlet neck 13 and the axial passage 25, but on the opposed side of the body from the outlet neck. The outer end of actuator mounting neck 17 has concentric external male retention threads 18 by which most of the internal components of the valve may be retained.

Both the inlet and outlet flow passages 19 and 25, respectively, are provided with concentric mounting grooves 21 and 16 for metal ring gasket seals (not shown) and concentric hole circles 20 and 15 for the mounting of the choke to connecting piping by means of threaded studs and nuts (not shown). The outlet flow passage has a terminal flange. The bolted and ring gasketed inlet and outlet connections are mateable with standard American Petroleum Institute (API) flange connections typically used for high pressures in the oilfield.

Figure 4:
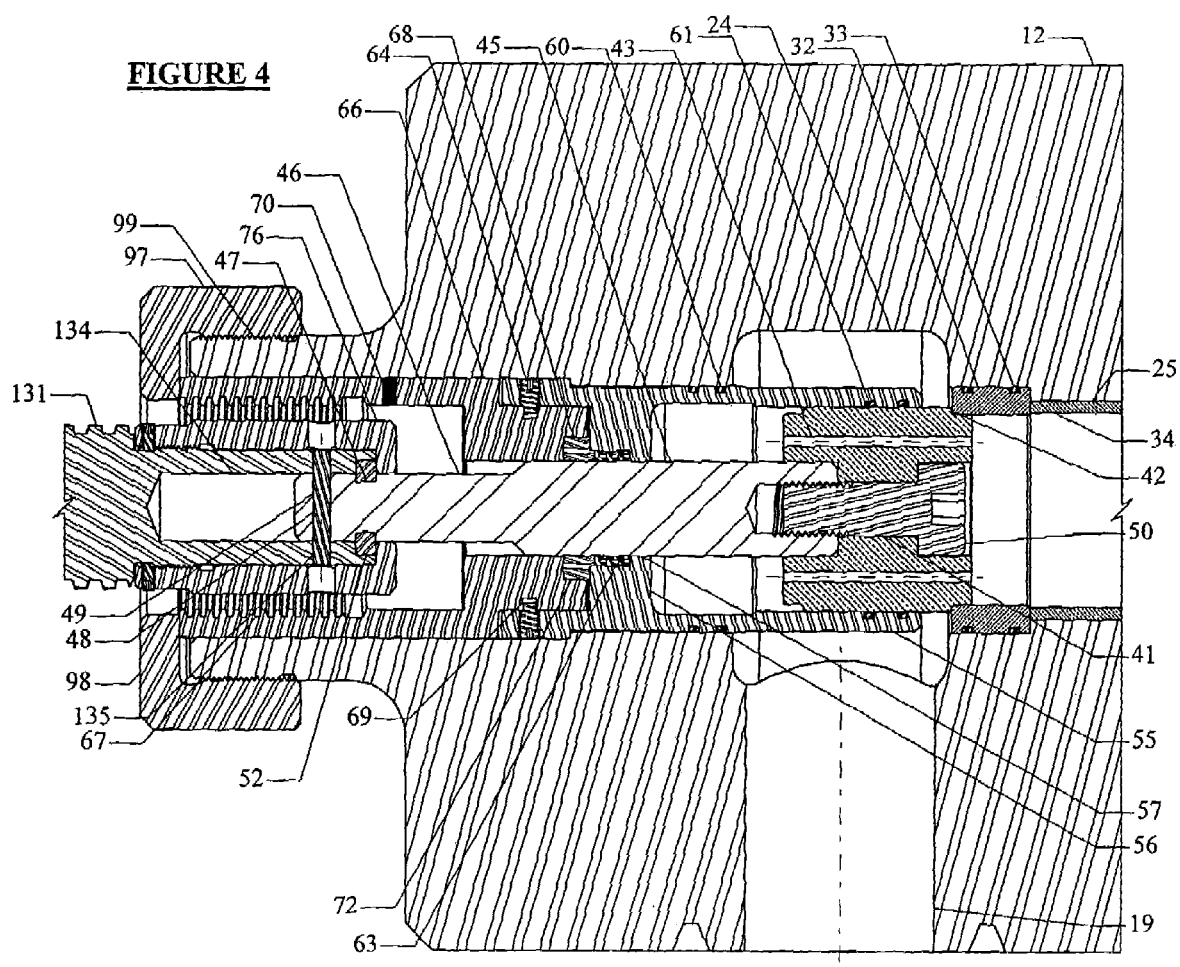
FIG. 4 is an enlarged view of the portion of FIG. 3 showing the throttling member and its connection to both the reciprocable control screw of the actuator and the other components of the choke valve.

FIGS. 3 and 4 illustrate the internal arrangements of the choke 11. Inlet flow passage 19 into body 12 is radial to the axis of the through axial passage 25 which extends from the actuator end to the outlet end of the body. Axial passage 25 has multiple coaxial bores along its length from the actuator end to the outlet end, with a coaxial enlarged counterbored annular, approximately cylindrical inlet distribution chamber 24 centrally located in body 12. Entry chamber 25 is radially intersected by inlet flow passage 19. The actuator end of axial passage has an outwardly facing transverse guide stop shoulder 26. On the outlet side of the axial passage 25 just below inlet distribution chamber 24 is a transverse seat stop shoulder 27. The bore of the outlet side of the axial passage 25 is reduced below the seat stop shoulder 27, but is again enlarged adjacent the outlet end at transverse liner stop shoulder 28.

Mounted in the large bore of passage 25 of the choke body 12 and abutting seat stop shoulder 27 on the outlet end of distribution chamber 24 is right circular annular cylindrical choke seat 32. The seat 32 is provided with a pair of external male O-rings 33. Outlet liner 34 is a thin-walled right circular cylindrical tube having a short exterior upset portion at its outlet end joined to the rest of the liner tube by an external transverse shoulder. The outlet liner 34 is inserted with a close slip fit into the outlet bore of the axial passage 25 to have its inner end abut against the outer end of seat 32 and its intermediate transverse shoulder abut against shoulder 28.

The flow passage from the cavity 25 to the choke outlet is restricted by choke gate 40. Choke gate 40 has an approximately right circular cylindrical shape with an axial through hole 41 having a counterbored enlargement on each end of the through hole. The end portions of the choke gate exterior cylindrical surface have short reduced diameter sections with conical transitions 42 to the central outer cylinder. The reduced diameter exterior end sections are a slip fit to the bore of seat 32. The conical transitions 42 serve as sealing faces for the choke gate 40 and are able to seal against the interior portion of the adjacent transverse upper end of the seat 32. Choke gate 40 is symmetrical about its transverse horizontal midplane, so that it may be inverted and a new sealing face 42 used when the first becomes leaky. Choke gate 40 has one or more internal flow passages 43 parallel to but offset from the longitudinal axis and connecting from one side to the other in order that it will not fluid lock and will be exposed to balanced opening forces when it is fully or nearly closed.

Figure 5:
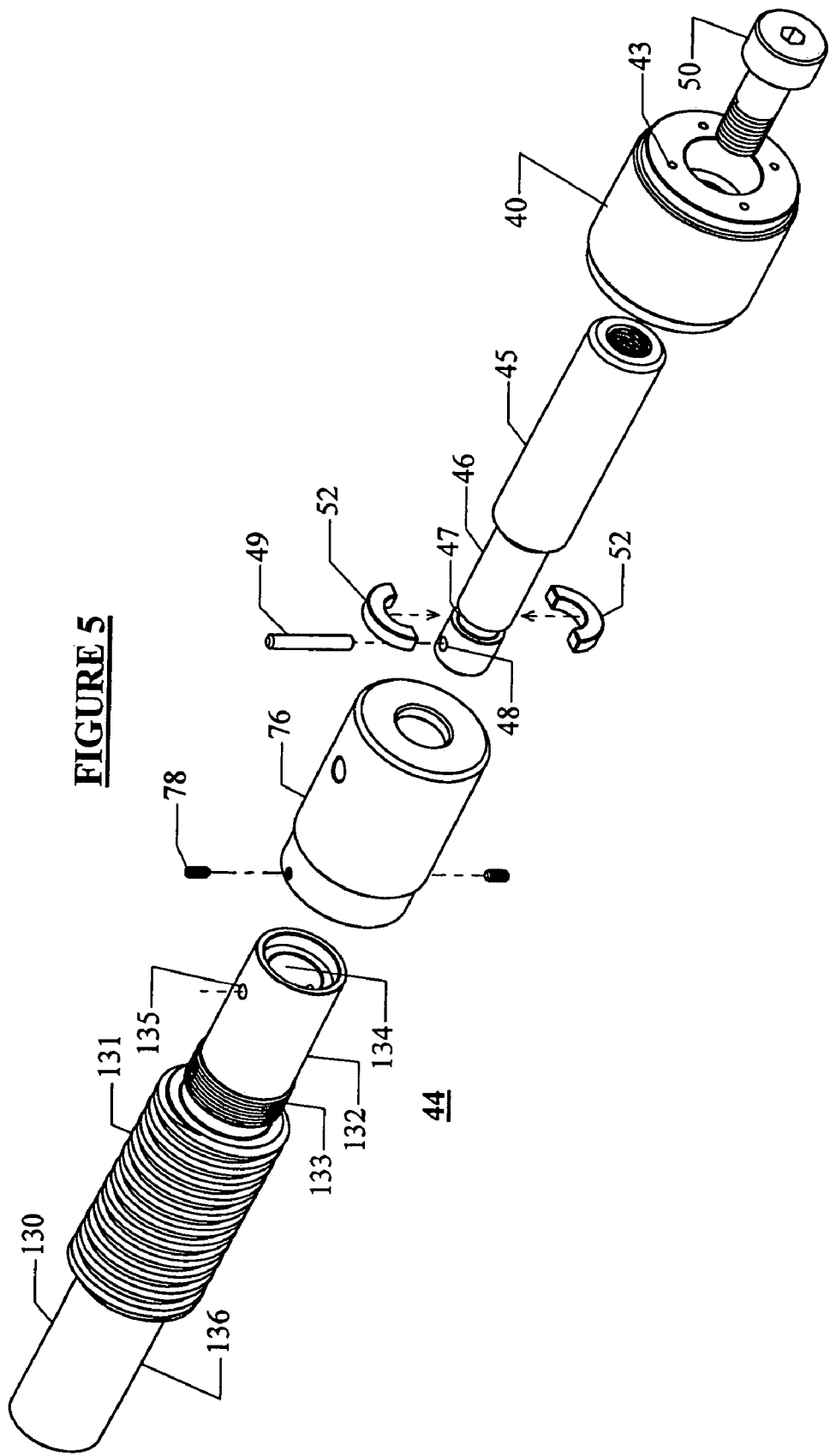
FIG. 5 is an oblique exploded view of the throttling member, the operating shaft, the reciprocable control screw, and their interconnection means.

FIGS. 4 through 6 illustrate the components of the shearable actuator subassembly 44. The subassembly shown in FIG. 5 consists of a stem 45, a shear pin 49, two split shear ring halves 52, a shear ring keeper nut 76, an axially reciprocable actuator screw 130, and set screws 78. In actual practice, either the shear pin 49 or the split shear ring halves are sufficient to provide a shear mechanism for backpressure relief in the choke valve, although both the shear pin and the split shear ring halves are illustrated in FIGS. 4 to 6. The shearable actuator subassembly 44 using only one of the shearable components (i.e., either the shear pin or the split shear ring) can readily be made from the drawings and description herein by one skilled in the art.

Choke gate 40 is located on stem 45, which is piloted into the upper counterbored pocket of the gate through hole 41, and attached thereto by means of Allen screw 50 that extends through axial through hole 41 in the choke gate.

Stem 45 is a stepped cylindrical rod extending upwardly towards linear actuator 100. The enlarged choke gate end of stem 45 is centrally drilled and tapped to threadedly engage with screw 50 for retaining the stem 45 and the choke gate 40 together. The shank 46 of stem 45 on its upper actuator end has an annular male groove 47 of rectangular cross-section and, adjacent the transverse end of the stem, a diametrical through hole 48 for mounting a closely fitting cylindrical shear pin 49. The shear pin 49, as illustrate in FIGS. 4 and 6, is not only used as part of a shearable mechanism in the shearable actuator subassembly 44, but the shear pin also serves as an antirotational device to keep the stem 45 and the choke gate 40 from rotating.

The portions of the choke exposed to high velocity flow (such as the gate 40, the seat 32, the outlet liner 34, and possibly the gate guide 55) will typically be constructed of sintered tungsten carbide, a ceramic material, or will be hardfaced with a suitable wear resistant material, such as Stellite 3™.

The two split shear ring halves 52 are each 180° or slightly less than 180° segments of a right circular cylindrical ring which closely fits into annular male shear ring mounting groove 47 of stem 45. The split ring halves 52 extend radially outwardly by approximately the depth of their mounting groove 47. The shear ring is in halves so that it can be installed and removed readily from groove 47.

Gate guide 55, also referred to as an operator nose, is a thin walled cylindrical tubular structure with a short enlarged cylindrical upper actuator end joined to the main body and having a downwardly facing intermediate exterior transverse shoulder at that transition in outer diameters. The lower exterior end of the gate guide 55 is also slightly reduced in diameter adjacent the inlet distribution chamber 24 of the choke body 12. The central external cylindrical section of gate guide 55 has multiple male O-ring grooves on its exterior at approximately mid length containing O-rings 60 which seal between the exterior of guide 55 and the upper bore of axial passage 25 of the choke body 12. The main bore through gate guide 55 is slightly enlarged at approximately midlength. The lower interior cylindrical face of gate guide 55 has multiple female O-ring grooves containing O-rings 61 that seal between the gate guide and the exterior cylindrical surface of the choke gate 40. At approximately one fourth of the length of gate guide 55 down from its upper actuator end, a thick interior transverse bulkhead 56 with a coaxial through hole 57 mounts multiple chevron seals 63 in a counterbore on the upper side of the through hole. The chevron seals 63 are oriented to prevent the escape of internal pressure in the annular gap between gate guide 55 and stem 45. Stem 45 is journaled with a close fit in the central through hole 57 of guide 55. Near the upper end of gate guide 55 are located a pair of diametrically opposed drilled and tapped holes which contain inwardly projecting half dog set screws 64.

The rear section 66 of the operator nose is a heavy walled cylindrical tube with a thick transverse diaphragm having a through hole on its lower end. The inner diameter of the operator nose's rear section through hole provides a close slip fit to the stem 45. At the lower end of the rear section 66, the through hole has a short cylindrical counterbore 68. The outer diameter of rear section 66 is reduced at a transverse shoulder near its lower end so that the lower end of the rear section 66 can enter the upper section of the bore of the gate guide 55 and the external shoulder abut the upper transverse end of the gate guide. Diametrically opposed detent holes 69 are match drilled through the drilled and tapped set screw holes of the gate guide 55 at assembly of the gate guide and the rear section 66 so that set screws 64 can retain the pieces in their desired abutted position. The upper transverse end of the rear section 66 projects slightly above the upper end of neck 17 of choke body 12. The upper interior bore of the rear section 66 has female thread 67 for connection with the actuator mounting hub 104 of actuator 100. A radial set screw hole 70 penetrates the wall of the rear section 66 at approximately midlength so that the threaded connection of the rear section and the actuator mounting hub 104 can be locked with set screw 71.

A short annular right circular cylindrical ring with a reduced outer diameter tip on its downward side serves as a seal contactor 72 for the seals 63. The reduced outer diameter of seal contactor 72 is a close slip fit to the seal housing counterbore of gate guide 55. The bore of seal contactor 72 is a close fit to the stem 45, and the transverse lower tip of the seal contactor bears on the heel of the uppermost of the stack of seals 63. Multiple through vent holes offset from and parallel to the axis of the seal contactor 72 aid in the avoidance of fluid lock in the seal cavity.

Shear ring keeper nut 76 is a thick walled right circular cylindrical annular ring with a transverse diaphragm 77 having a coaxial through hole at its lower end. The through hole has a slip fit with the shank 46 of stem 45. The upper bore of shear ring keeper nut 76 is threaded for connecting with the reciprocable actuator screw 130 of the actuator 100. Adjacent its upper end, shear ring keeper nut 76 has a pair of diametrically opposed drilled and tapped holes which mount set screws 78 for locking the threaded connection of nut 76 to the screw 130. Closer to the diaphragm 77 at the lower end of nut 76, a pair of diametrically opposed holes is aligned with the axis of shear pin hole 48 of stem 45 when the shearable actuator assembly is made up. This pair of holes provides access to the shear pin 49.

Hollow keeper nut 97 is threadedly attached to the male threads 18 of the externally threaded actuator mounting neck 17 of the choke body 12 and serves to retain the internal components of the choke, which include the choke gate 40 and the stem 45, gate guide 55, rear section 66, seal contactor 72, and seals 63. The keeper nut 97 has a heavy walled right circular cylindrical annular body open at its lower end and with a female thread 99 threadedly comated to the male thread 18 on the upper mounting neck 17 of choke body 12 on its interior. At the upper end of keeper nut 97 is a transverse diaphragm 98 with a central through hole which provides a shoulder for engaging the upper transverse end of the rear section 66.

The actuator 100 is not described in detail, since such actuators are in very broad use and are well known to those skilled in the art. Only a general description of one type of actuator is given here. The actuator 100 may be manual or either electrically, hydraulically, or pneumatically operated. In most cases, the actuator 100 will be powered and also provided with a separate manual override, as is shown in FIGS. 1 and 2. Referring to FIG. 1, the actuator box 101 of the actuator is a rectangular prismatic hollow box with a removable lid and exterior mounting bosses to which the actuator drive 102 and the actuator mounting hub 104 are mounted by screws. Mounting hub 104 is a transverse circular flange having a bolt hole circle for connection to the box 101 and with a coaxial right circular cylindrical neck extending downwardly and a coaxial through hole. Male mounting hub neck threads 105 are on the lower exterior end of the neck of mounting hub 104 and serve to attach the actuator to the choke 11 by being threadedly engaged into the female threads 67 of the rear section 66. Set screw 71 restrains that connection.

The actuator drive 102 is a rotary device powered by an electric power line or hydraulic or pneumatic hoses (not shown). Coaxial with and on the opposed side of the box 101 from the actuator drive 102 is a selectably manually engagable handwheel 103 which is normally declutched, but can be used to operate the internal worm gear drive of the actuator 100 if the actuator drive malfunctions. The handwheel shaft 108 is supported in a bearing (not shown) in the external boss projecting from the actuator body 101 on the handwheel side. Internal to the body 101 is the worm gear set mount 112 in which are a mounted worm 111 and a screw drive worm gear 117 driven by the driven shaft 110 common to the drive shaft 106 and the handwheel shaft 108. Shaft 110 is directly attached to the worm 111. Both gears are supported on bearings in the mount 112 and prevented from shifting axially by their mountings therein. Worm gear 117 is driven on its outer periphery by worm 111. Coaxial with the worm gear peripheral gear and its journaling ends is the interior bore of the worm gear 117, wherein female acme drive thread 118 is located. The worm gear drive is used in order to provide a torque multiplication and speed reduction for the drive and also to resist backdriving of the actuator by thrusts on the actuator shaft. An antirotation flange 115 is mounted on top of the worm gear set mount 112 in a position coaxial with the worm gear 117. Antirotation flange 115 consists of a transverse flange with mounting holes and a coaxial upwardly projecting right circular cylindrical tubular neck which has an internal integral rectangular section antirotation key 116 extending radially into the through bore of the antirotation flange.

Axially reciprocable actuator screw 130 provides the output for the actuator. Actuator screw 130 has a male acme thread 131 in its midsection and a reduced diameter coaxial lower shank 132 extending downwardly. The region of the lower shank 132 adjacent to the acme thread 131 of the actuator screw has a male thread 133 that may be threadedly engaged with the female upwardly-looking threads of the shear ring keeper 76. Lower shank 132 fits within the bore of the shear ring keeper 76. The lower shank 132 has a downwardly opening coaxial bore lower shank socket 134 which is a close sliding fit to the shank 46 of stem 45. A transverse shoulder connects the main bore of socket 134 with a short enlarged counterbore which is a close fit to the outside of the shear ring halves 52 when they are mounted in the shear ring groove 47 of the stem 45. A diametrical shear pin hole 135 sized to accommodate shear pin 49 extends through lower shank 132 of actuator screw 130 in a position that is coaxial with the corresponding shear pin hole 48 of stem 45 when the shearable actuator subassembly 44 is assembled together. Reduced diameter cylindrical upper shank 136 is located on the upper end adjoining acme thread 131 of actuator screw thread 130. An upwardly opening longitudinal antirotation keyway 137 is cut into the length of upper shank 136. Keyway 137 is sized to slidingly engage the antirotation key 116 of the antirotation flange 115 so that actuator screw 130 cannot be rotated.

Operation of the Invention

The choke 11 of the hydraulic choke valve assembly 10 shown in the present invention is operated by nonrotating linear up and down stroking of the actuator screw 130 of the actuator 100 shown herein. The choke gate 40, supported and operated by the shearable actuator subassembly 44, is guided in its reciprocation by the gate guide 55. The chevron seals 63 are held in place so that they can seal to the stem 45 by the rear section 66 and the seal contactor 72, which are themselves held in place by keeper nut 97 engaging the threads 18 of the actuator mounting neck 17. Likewise, the gate guide 55 is held in place axially by being abutted by both the guide stop shoulder 26 and the operator nose's rear section 66. The actuator 100 is rigidly mounted to the choke 11 by the threads 105 of the actuator mounting hub 104 engaging the female threads 67 of the rear section 66.

The antirotation flange 115 of the actuator restrains the axially reciprocable actuator screw 130 against rotation when the drive shaft 110 and its attached worm 111 rotate worm gear 117. The worm gear 117 is itself held against axial translation by its fixity against linear motion by its mounting in the worm gear set mount 112 of the actuator 100. Accordingly, the actuator screw 130 is caused to reciprocate by appropriate rotation of the worm gear 117.

The choke valve 11 has its choke gate 40 pressure balanced because of the communication of fluid pressure from one end of the choke gate to the other through the internal flow passages 43 of the gate. This pressure balancing of the gate permits the pressure on the stem 45 of the choke to be reduced and, accordingly, the pressure loads typically expected on the actuator through the stem will be correspondingly reduced. This is because the pressure in the outlet of the choke acts only on the cross-sectional area of the shank 46 of the stem 45; the pressure load on the actuator is the product of the outlet pressure and the shank area. The consequence of this is that smaller actuators can be used to control a given flow condition, when compared to the conventional unbalanced chokes.

Normally, pressures in the outlet branch of the choke 11 (i.e., through the bores of the choke seat 32 and the outlet liner 34) are much lower than in the inlet port 19. When the choke is in good condition, it will reliably seal when the sealing face 42 of the gate 40 is pressed against the seat 32. Since the outlet side of the choke is typically vented, the pressure on the outlet line would thus be very low in such a case. Even when the choke is opened and exposed to a high inlet pressure, it is typically operated in a manner such that a very, high pressure drop is taken across the flow orifice opened between the gate 40 and the seat 32, with the result that the outlet pressure still would be low. Thus, in the normal situation, the axial loads transmitted to the stem 45 and hence to the actuator 100 through the connection of the stem to the actuator screw 130 are low.

Figure 8:
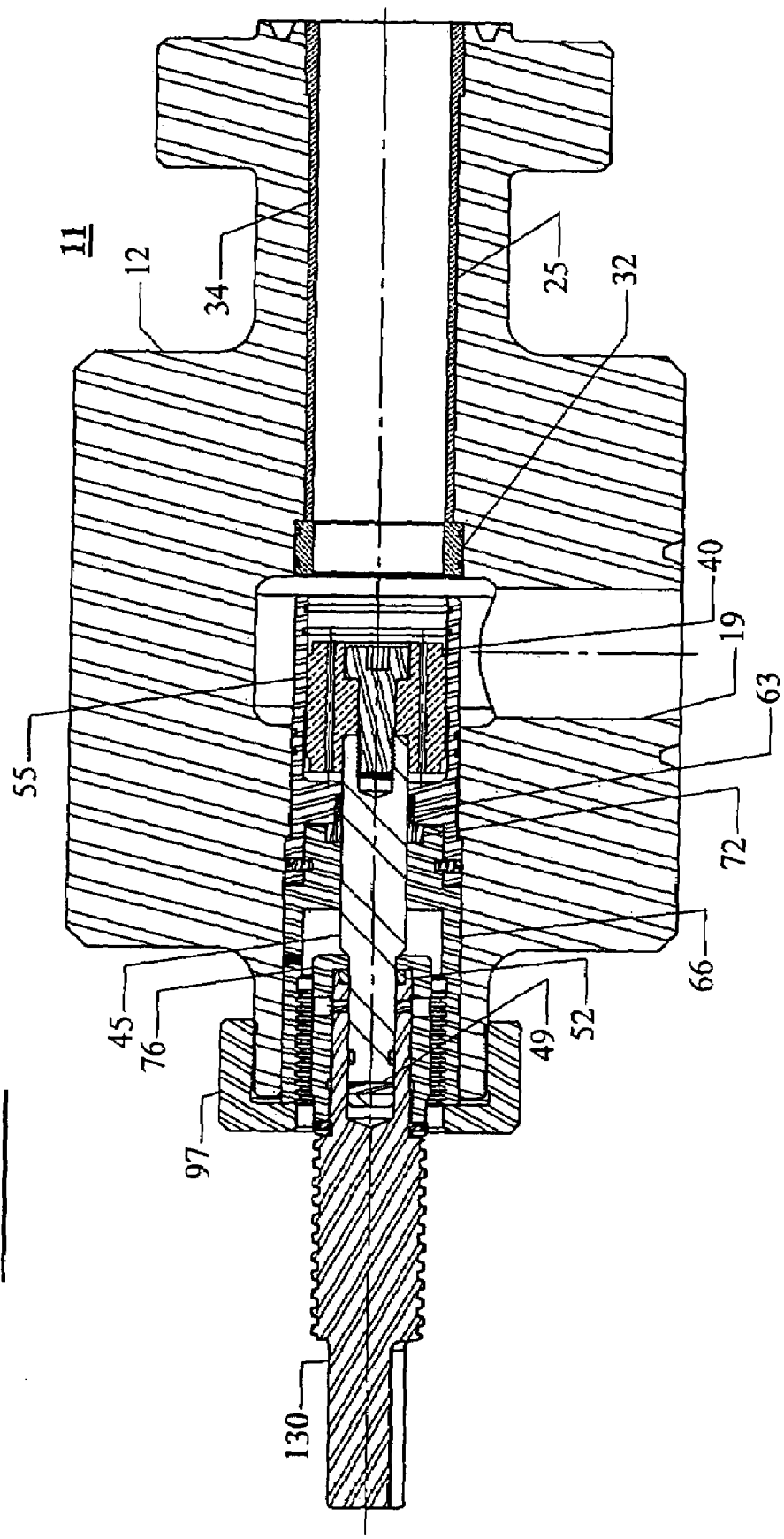
FIG. 8 is a longitudinal cross-sectional view of the choke valve and reciprocable actuator control screw corresponding to FIG. 3, but with the shearable overpressure protection mechanism sheared.

In the event of a stoppage in the outlet line or some other flow upset, such as a downstream water hammer or the opening of a valve at the wrong time, very high pressures can be produced in the outlet line of the choke 11. In such an instance, a high pressure induced axial compression load is translated to the stem 45 of the choke. This high load has the potential to damage the stem 45, the actuator 100, or both the stem and actuator. However, referring to FIGS. 5 through 6, it is apparent that the compressive reaction load path from the stem 45 to the actuator screw 130 has to pass through the split shear rings 52 and the shear pin 49. Thus, the shear areas and shear strengths of the shear pin 49 and the split shear rings 52 are preselected to structurally fail when exposed to a predetermined, safe axial load through shear. The resultant shear failure will cause the shear pin 49 and the split ring halves 52 to separate on the cylindrical interface between the shank 46 of the stem 45 and the lower shank socket 134 of the actuator screw 130, as shown in FIG. 7. The shear pin will separate into residual segments 49a and 49b, while the split shear rings will separate into segments 52a and 52b, as seen in FIG. 7. After the failure of these weak link members, the choke gate 40 and the attached stem 45 both will shift upwardly toward the actuator 100 by telescoping of the stem into the lower shank socket 134 under the action of the pressure force on the stem. When this has happened, the orifice between the choke gate 40 and the seat 32 will be fully opened, as shown in FIG. 8, thereby permitting the outlet side pressure to vent upstream if the pressure comes from downstream. The venting in such a case, due to careful selection of the failure properties of the shearing members 49 and 52, should prevent excessive loads from occurring to either the actuator or the stem. If the pressure on the inlet side of the choke 11 is already high when the backpressure becomes elevated, the stem 45 is still protected by virtue of its effective unsupported length being shortened due to telescoping into the actuator screw 130. The buckling tendencies of an axially compressed member generally are much reduced when its unsupported length is reduced. The actuator 100 and the upper group of choke internal parts 40 through 97 readily can be removed from the choke body 12 by disconnecting keeper nut 97. This permits easy access to the choke internal parts so that the shear pin 49 and the split shear rings 52 simply can be replaced and the choke reassembled after the backpressure condition is eliminated.

The present invention permits the use of a smaller, less expensive actuator for a choke while at the same time greatly reducing the likelihood of failure of the choke stem or the actuator due to an incident of high backpressure on the choke outlet line. Two separate modes of equipment risk reduction result from the use of a shearable, telescoping link between the actuator and the stem supporting the pressure balanced choke gate. The first is the reduction of the unsupported length of the stem, whereby its tendency to buckle and overstress is greatly reduced. The second advantage is the venting of pressure upstream so that the high backpressure is released prior to damaging the choke assembly. This second advantage requires that the upstream pressure be relatively low when the high backpressure occurs. This and other advantages will be readily apparent to those familiar with the art.

Although the present invention and its advantages have been described in detail, it should be understood that various changes, substitutions and alterations can be made herein without departing from the spirit and scope of the invention as defined by the appended claims.

What is claimed is:

1. A choke valve comprising:
   a body having an axial through hole and a radial entry port;
   a valve seat coaxially housed in the body axial through hole on a first side of said radial entry port;
   a pressure balanced valving member axially reciprocable within the body axial through hole between a first sealing position bearing against said valve seat and a second position spaced away from said seat;

actuator means for applying reciprocatory motion to the pressure balanced valving member through an intermediate structure; and a shearable mechanism interconnecting the actuator means and the valving member, wherein the shearable mechanism includes a stem and two split shear ring halves mounted in a mounting groove in the stem and retained therein by a retension device where the stem serves as the intermediate structure, wherein the shearable mechanism is responsive to fluid pressure in excess of a predetermined value.

2. The choke valve of claim 1, further comprising an antirotational device for preventing the valving member from rotating.

3. The choke valve of claim 2, wherein the antirotational device includes a stem and a shear pin connecting the stem to the actuator means.

4. The choke valve of claim 1, wherein the shearable mechanism includes a shear pin.

5. The choke valve of claim 1, wherein the actuator means is manually, electrically, hydraulically or pneumatically operated.

6. A choke valve comprising:
a body having an axial through hole passing from a first side of the body to a second side of the body, an outlet passageway coaxially aligned with the through hole and positioned at the first side of the body, and a radial inlet port intersecting the through hole between the first and second sides of the body;
a valve seat coaxially housed in the through hole between the inlet port and the outlet passageway;
a valving member axially reciprocable within the through hole between a first position bearing against the valve seat and a second open position spaced away from the valve seat;
an actuator attached to the second side of the body for reciprocably moving the valving member between the first position and the second position wherein the actuator includes an axially reciprocable actuator shank; and
a shearable mechanism having a stem interconnecting the actuator shank and the valving member and two split shear ring halves mounted in a mounting groove in the stem and retained therein by a retension device;
whereby whenever the shearable mechanism is subjected to fluid pressure in excess of a predetermined value from the outlet passageway the shearable mechanism will shear thereby allowing the release of backpressure.

7. The choke valve of claim 6, further comprising an antirotational device to prevent the rotation of the valving member.

8. The choke valve of claim 6, wherein at least one fluid channel traverses the valving member.

9. The choke valve of claim 6, wherein the shearable mechanism includes a shear pin connecting the stem to the actuator shank.

10. The choke valve of claim 9, wherein one end of the actuator shank has a socket, the socket receiving a first end of the stem.

11. The choke valve of claim 10, wherein the shear pin joins the first end of the stem to the actuator shank while the stem is positioned within the socket at less than the full length of the socket.

12. The choke valve of claim 6, wherein one end of the actuator shank has a socket, the socket receiving a first end of the stem.

13. The choke valve of claim 6, wherein the actuator is manually, electrically, hydraulically or pneumatically operated.

14. A choke valve comprising:
a body having an axial through hole passing from a first side of the body to a second side of the body, an outlet passageway coaxially aligned with the through hole and positioned at the first side of the body, and a radial inlet port intersecting the through hole between the first and second sides of the body;
a valve seat coaxially housed in the through hole between the inlet port and the outlet passageway;
a pressure balanced valving member axially reciprocable within the through hole between a first position bearing against the valve seat and a second open position spaced away from the valve seat;
an actuator attached to the second side of the body, the actuator having an axially reciprocating actuator shank for reciprocably moving the valving member between the first position and the second position;
an antirotational device preventing the valving member from rotating within the through hole; and
a shearable mechanism interconnecting the actuator shank and the valving member, the shearable mechanism comprising
a stem, a first end of the stem positioned in a socket in one end of the actuator shank and a second end of the stem mounted to the valving member,
a shear pin passing through the stem proximal to first end of the stem and passing through a wall of the socket in the actuator shank when the first end of the stem is located in the socket at less than a full depth of the socket; and
a pair of split shear ring halves mounted in a mounting groove in the stem proximal to the shear pin, and a shear ring keeper device mounted over the shear ring halves and the shear pin to maintain the shear ring halves and the shear pin in position;
whereby whenever the valving member is subjected to a fluid pressure in excess of a predetermined value from the outlet passageway the shear pin will shear and the stem will move further into the socket in the actuator shank thereby allowing the release of backpressure.

15. The choke valve of claim 14, wherein the valving member has at least one fluid channel traversing the valving member.

16. A choke valve comprising:
a body having an axial through hole passing from a first side of the body to a second side of the body, an outlet passageway coaxially aligned with the through hole and positioned at the first side of the body, and a radial inlet port intersecting the through hole between the first and second sides of the body;
a valve seat coaxially housed in the through hole between the inlet port and the outlet passageway;
a pressure balanced valving member axially reciprocable within the through hole between a first position bearing against the valve seat and a second open position spaced away from the valve seat;
an actuator attached to the second side of the body, the actuator having an axially reciprocating actuator shank for reciprocably moving the valving member between the first position and the second position;
an antirotational device preventing the valving member from rotating within the through hole; and a shearable mechanism interconnecting the actuator shank and the valving member, the shearable mechanism comprising a stem, a first end of the stem positioned in a socket in one end of the actuator shank at less than a full depth of the socket and a second end of the stem mounted to the valving member, a pair of split shear ring halves mounted in a mounting groove in the stem proximal to the first end of the stem, and a shear ring keeper device mounted over the shear ring halves to maintain the shear ring halves in position;

whereby whenever the shearable mechanism is subjected to a fluid pressure in excess of a predetermined value from the outlet passageway the shear ring halves will shear and the stem will move further into the socket in the actuator shank thereby allowing the release of backpressure.

17. A choke valve comprising:

a body having an axial through hole passing from a first side of the body to a second side of the body, an outlet passageway coaxially aligned with the through hole and positioned at the first side of the body, and a radial inlet port intersecting the through hole between the first and second sides of the body;

a valve seat coaxially housed in the through hole between the inlet port and the outlet passageway;

a valving member axially reciprocable within the through hole between a first position bearing against the valve seat and a second open position spaced away from the valve seat;

an actuator attached to the second side of the body for reciprocably moving the valving member between the first position and the second position wherein the actuator includes an axially reciprocable actuator shank having a shank socket; and a shearable mechanism having a stem interconnecting the actuator shank and the valving member, wherein a first end of the stem is positioned in the shank socket at less than a full depth of the shank socket;

whereby whenever the shearable mechanism is subjected to fluid pressure in excess of a predetermined value from the outlet passageway the shearable mechanism will shear and the stem will move further into the shank socket thereby moving the valving member away from the valve seat to allow the release of backpressure.

* * * * *